United States Patent
Ma et al.

(10) Patent No.: US 11,196,538 B2
(45) Date of Patent: Dec. 7, 2021

(54) IMAGE ENCRYPTION METHOD AND APPARATUS, SENSOR AND READABLE STORAGE MEDIUM

(71) Applicant: Guangdong University of Technology, Guangzhou (CN)

(72) Inventors: Jianguo Ma, Guangzhou (CN); Shaohua Zhou, Guangzhou (CN); Zhiyuan Gao, Guangzhou (CN)

(73) Assignee: GUANGDONG UNIVERSITY OF TECHNOLOGY, Guangzhou (CN)

( * ) Notice: Subject to any disclaimer, the term of this patent is extended or adjusted under 35 U.S.C. 154(b) by 78 days.

(21) Appl. No.: 16/664,944

(22) Filed: Oct. 28, 2019

(65) Prior Publication Data
US 2021/0044418 A1 Feb. 11, 2021

(30) Foreign Application Priority Data
Aug. 9, 2019 (CN) .......................... 201910735115.8

(51) Int. Cl.
*H04L 9/00* (2006.01)
*H04N 5/232* (2006.01)

(52) U.S. Cl.
CPC ......... *H04L 9/001* (2013.01); *H04N 5/23229* (2013.01)

(58) Field of Classification Search
CPC .. H04L 9/28; H04L 9/00; H04L 9/001; H04K 1/00; G06K 9/00; G06K 9/36;
(Continued)

(56) References Cited

U.S. PATENT DOCUMENTS

| 5,533,127 A * | 7/1996 | Luther | H04N 1/4486 380/216 |
| 5,907,312 A * | 5/1999 | Sato | G09F 19/18 345/31 |

(Continued)

FOREIGN PATENT DOCUMENTS

| CN | 1949863 A | 4/2007 |
| CN | 105117653 A | 12/2015 |

(Continued)

OTHER PUBLICATIONS

Qiang Zhang, Ling Guo, Xiaopeng Wei, A novel image fusion encryption algorithm based on DNA sequence operationand hyperchaotic system, Jun. 12, 2012, Elsevier, pp. 3596-3600. (Year: 2012).*

(Continued)

*Primary Examiner* — Thanhnga B Truong

(57) ABSTRACT

The present disclosure discloses an image encryption method comprising: acquiring a row encryption sequence and a column encryption sequence, and acquiring, from a pixel array component of a sensor, pixel rows corresponding to the respective elements of the row encryption sequence; encrypting and sorting pixels in each of the pixel rows by using the column encryption sequence to obtain encrypted pixel rows corresponding to the respective pixel rows; and arranging the encrypted pixel rows according to a preset arrangement order to obtain an encrypted image. The method may perform encryption when generating an original image to obtain an encrypted image. In addition, the present disclosure also provides an image encryption apparatus, a sensor, and a computer readable storage medium, which also have the above-mentioned beneficial effects.

13 Claims, 2 Drawing Sheets

(58) Field of Classification Search
CPC .......... H04N 21/2347; H04N 5/23229; H04N 5/232; H04N 21/234; H04N 21/235; H04N 7/167; H04N 1/44
See application file for complete search history.

(56) References Cited

U.S. PATENT DOCUMENTS

| | | | |
|---|---|---|---|
| 6,870,929 B1* | 3/2005 | Greene | H04L 9/0637 380/28 |
| 6,912,658 B1* | 6/2005 | Glogau | H04N 1/32154 380/43 |
| 8,798,382 B2* | 8/2014 | Jain | G06F 16/50 382/232 |
| 9,268,988 B2* | 2/2016 | Benkley, III | G01N 27/04 |
| 2002/0191091 A1* | 12/2002 | Raynor | H04N 1/32128 348/241 |
| 2006/0126829 A1* | 6/2006 | Lai | G09C 5/00 380/28 |
| 2009/0135311 A1 | 5/2009 | Kurita et al. | |
| 2017/0339302 A1 | 11/2017 | Rhoads et al. | |

FOREIGN PATENT DOCUMENTS

| | | |
|---|---|---|
| CN | 105704500 A | 6/2016 |
| CN | 106296560 A | 1/2017 |
| CN | 106997606 A | 8/2017 |
| CN | 108270944 A | 7/2018 |
| CN | 105513002 B | 1/2019 |

OTHER PUBLICATIONS

Zhongyun Hua et al., "Image Encryption Using Josephus Problem and Filtering Diffusion", IEEE ACCESS, vol. 7, 2019, p. 8660-8674, XP011706397, DOI: 10.1109/ACCESS.2018.2890116 (retrieved on Jan. 21, 2019).

Combined Search and Examination Report for the corresponding application No. GB1915565.4, dated Aug. 13, 2020, 16 pages total.

First Office Action and Search Report for the corresponding CN application No. 201910735115.8, dated Mar. 1, 2021, 2 pages total.

* cited by examiner

IMAGE ENCRYPTION METHOD AND APPARATUS, SENSOR AND READABLE STORAGE MEDIUM

CROSS-REFERENCE TO RELATED APPLICATIONS

The present application claims the priority of Chinese patent application No. 201910735115.8, filed on Aug. 9, 2019, which is hereby incorporated by reference in its entirety.

TECHNICAL FIELD

The present disclosure relates to the technical field of information security, and in particular, to an image encryption method and apparatus, a sensor, and a computer readable storage medium.

BACKGROUND

With the rapid development of information technology, information security is particularly important. Image information and video information for military, commercial and high-tech industries require very strict confidentiality measures to prevent national security and economic threats.

The conventional image encryption technology encrypts an original image by using compression, encoding, etc. after the original image is completed. Such an encryption technology can only encrypt the original image obtained after it is acquired and outputted. If an original image is leaked after it is acquired and outputted and before it is subjected to a conventional image encryption processing, the original image is not protected by any encryption measures. Therefore, the existing image encryption technology has security vulnerabilities.

Therefore, how to solve the problem that the existing image encryption technology has security vulnerabilities is a technical problem that those skilled in the art need to solve.

SUMMARY

In view of this, an object of the present disclosure is to provide an image encryption method and apparatus, a sensor, and a computer readable storage medium, which solve the problem of security vulnerabilities in the existing image encryption technology that there are not any encryption measures for an image after it is outputted and before it is subjected to the conventional image encryption processing.

To solve the above technical problem, the present disclosure provides an image encryption method comprising:

acquiring a row encryption sequence and a column encryption sequence, and acquiring, from a pixel array component of a sensor, pixel rows corresponding to the respective elements of the row encryption sequence;

encrypting and sorting pixels in each of the pixel rows by using the column encryption sequence to obtain encrypted pixel rows corresponding to the respective pixel rows; and arranging the encrypted pixel rows according to a preset arrangement order to obtain an encrypted image.

Optionally, the acquiring the row encryption sequence and the column encryption sequence comprises:

acquiring an encryption sequence, and acquiring a row encryption vector and a column encryption vector by using the encryption sequence; and decoding the row encryption vector to obtain the row encryption sequence, and decoding the column encryption vector to obtain the column encryption sequence.

Optionally, the acquiring the row encryption vector and the column encryption vector by using the encryption sequence comprises:

performing chaotic encryption on the encryption sequence to obtain a row chaotic sequence and a column chaotic sequence; and acquiring the row encryption vector by using the row chaotic sequence, and acquiring the column encryption vector by using the column chaotic sequence.

Optionally, the arranging the encrypted pixel rows according to the preset arrangement order comprises:

arranging the encrypted pixel rows according to an order of positions of the elements in the row encryption sequence.

The present embodiment further provides an image encryption apparatus comprising:

a pixel row acquisition module for acquiring a row encryption sequence and a column encryption sequence, and acquiring, from a pixel array component, pixel rows corresponding to the respective elements of the row encryption sequence;

a pixel row encryption module for encrypting and sorting pixels in each of the pixel rows by using the column encryption sequence to obtain encrypted pixel rows corresponding to the respective pixel rows; and an encrypted image acquisition module for arranging the encrypted pixel rows according to a preset arrangement order to obtain an encrypted image.

Optionally, the pixel row acquisition module comprises:

an encryption vector acquisition unit for acquiring an encryption sequence, and acquiring a row encryption vector and a column encryption vector by using the encryption sequence; and an encryption sequence acquisition unit for decoding the row encryption vector to obtain the row encryption sequence, and decoding the column encryption vector to obtain the column encryption sequence.

Optionally, the encryption vector acquisition unit comprises:

a chaotic sequence acquisition subunit for performing chaotic encryption on the encryption sequence to obtain a row chaotic sequence and a column chaotic sequence; and an encryption vector acquisition subunit for acquiring the row encryption vector by using the row chaotic sequence, and acquiring the column encryption vector by using the column chaotic sequence.

Optionally, the encrypted image acquisition module comprises:

an arrangement unit for arranging the encrypted pixel rows according to an order of positions of the elements in the row encryption sequence.

The present embodiment further provides a sensor comprising a processor, a sequence generation component, a pixel array component, a pixel row readout component, a signal conversion component, an encryption component, and an image output port, wherein:

the sequence generation component is connected to the processor for acquiring a row encryption sequence and a column encryption sequence, and sending the row encryption sequence and the column encryption sequence to the processor;

the processor is separately connected to the pixel row readout component and the encryption component for receiving the row encryption sequence and the column encryption sequence, and sending the row encryption sequence to the pixel row readout component and the encrypting component, and sending the column encryption sequence to the encryption component;

the pixel row readout component is separately connected to the signal conversion component and the pixel array component for acquiring an analog signal pixel row in the pixel array component according to the row encryption sequence, and sending the analog signal pixel row to the signal conversion component;

the signal conversion component is connected to the encryption component for performing a digitization processing of the analog signal pixel row to obtain a pixel row, and sending the pixel row to the encryption component; and the encryption component is connected to the image output port for encrypting the pixel rows by using the row encryption sequence and the column encryption sequence to obtain an encrypted image, and outputting the encrypted image via the image output port.

The present embodiment further provides a computer readable storage medium for storing a computer program, wherein the computer program, when being executed by a processor, implements the image encryption method described above.

It can be seen that the method uses a row encryption sequence to transform pixel positions of pixel rows in the image, then uses a column encryption sequence to encrypt and arrange the pixel rows, and changes the pixel positions of the image in a spatial range so as to directly output an encrypted image. That is, an image just generated is the encrypted image. Since the image just outputted is an encrypted image, the method can ensure the security of image information after it is acquired and outputted before it is subjected to the conventional image encryption process. The security vulnerabilities of the existing image encryption technology are remedied, and the problem of security vulnerabilities in the existing image encryption technology that there are not any encryption measures for an image after it is outputted and before it is subjected to the conventional image encryption processing is solved.

In addition, the present disclosure also provides an image encryption apparatus, a sensor, and a computer readable storage medium, which also have the above-mentioned beneficial effects.

BRIEF DESCRIPTION OF THE DRAWINGS

In order to more clearly illustrate the technical solutions in embodiments of the present disclosure or the prior art, the accompanying drawings needed to be used in the description of the embodiments or the prior art will be briefly described below. Obviously, the accompanying drawings in the following description are only some examples of the embodiments of the present disclosure, and other accompanying drawings can be obtained by ordinary persons skilled in the art from these without any creative efforts.

DETAILED DESCRIPTION

In order to make objects, technical solutions and advantages of the embodiments of the present disclosure clearer, the technical solutions in the embodiments of the present disclosure will be clearly and completely described below in conjunction with the accompanying drawings in the embodiments of the present disclosure. Obviously, the described embodiments are only a part of the embodiments of the present disclosure, not all of the embodiments. All other embodiments obtained by the ordinary persons skilled in the art based on the embodiments of the present disclosure without creative efforts are within the scope of the present disclosure.

Figure 1:
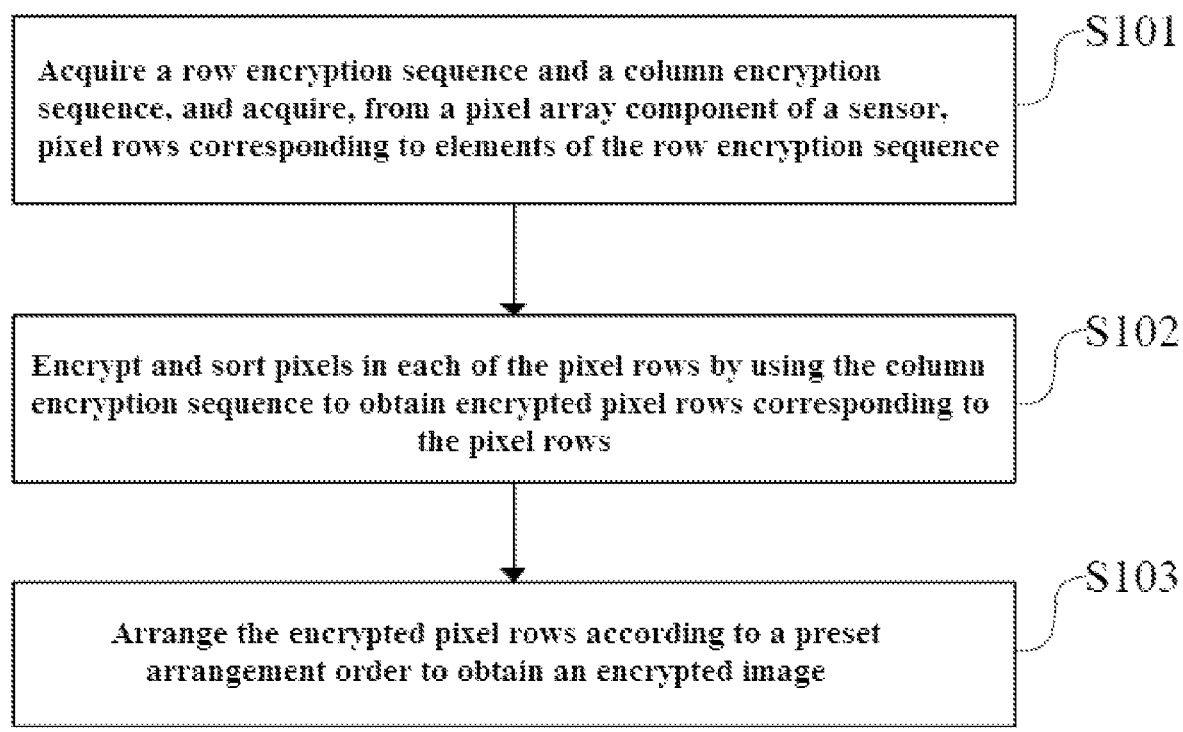
FIG. 1 is a flowchart of an image encryption method according to an embodiment of the present disclosure.

Refer to FIG. 1, which is a flowchart of an image encryption method according to an embodiment of the present disclosure. The method comprises:

S101: acquiring a row encryption sequence and a column encryption sequence, and acquiring, from a pixel array component of a sensor, pixel rows corresponding to the respective elements of the row encryption sequence.

The row encryption sequence is used to arrange and encrypt the pixel rows in a pixel array of a sensor, and the column encryption sequence is used to arrange and encrypt the pixels in the pixel rows. The method for acquiring the row encryption sequence and the column encryption sequence is not limited in the present embodiment. For example, the row encryption sequence and the column encryption sequence may be preset, and the row encryption sequence and the column encryption sequence are called when an image is captured to directly generate an encrypted image; or an encryption sequence can be acquired, and an encryption system is then used to generate the row encryption sequence and the column encryption sequence. The present embodiment does not limit the timing of performing the operation of acquiring the row encryption sequence and the column encryption sequence. For example, when the row encryption sequence and the column encryption sequence are preset, the row encryption sequence and the column encryption sequence may be acquired immediately after receiving an acquisition instruction. Alternatively, when an encryption system needs to be used to generate the row encryption sequence and the column encryption sequence, the encryption sequence and the column encryption sequence may be acquired by the encryption system immediately after the encryption sequence is acquired. For the number of elements in the row encryption sequence and the column encryption sequence, it is not limited in the present embodiment as long as the number of elements of the row encryption sequence is the same as the number of pixel rows of the pixel array component, and the number of elements of the column encryption sequence and the pixel array is the same as the number of pixel columns of the pixel array component.

In order to improve the encryption capability to obtain a better encryption effect and prevent cracking, an encryption system can be used to generate the row encryption sequence and the column encryption sequence. It is preferable in the present embodiment that a chaotic encryption system is used to generate the row encryption sequence and the column encryption sequence.

Specifically, an encryption sequence may be obtained, and the encryption sequence is chaotically encrypted to obtain a row chaotic sequence and a column chaotic sequence. The number of acquired encryption sequences is not limited in the present embodiment. For example, one encryption sequence may be acquired, and a row chaotic sequence and a column chaotic sequence are generated by using the encryption sequence. For example, a row chaotic sequence may be generated by using an encryption sequence, then an element number change processing is performed on the encryption sequence to obtain a processed encryption sequence, and a column chaotic sequence is generated by using the processed encryption sequence. In order to make the row encryption sequence independent of the column encryption sequence, and further improve the encryption capability, it is preferable in the present embodiment that a first encryption sequence $x_0$ and a second encryption sequence $y_0$ may be separately obtained, the first encryption sequence is used to generate the row chaotic sequence, and the second encryption sequence is used to generate the column chaotic sequence. Specifically, two chaotic sequences may be separately generated by using a logistic mapping expression $z_{k+1}=\mu z_k(1-z_k)$, that is, a first chaotic sequence corresponding to the first encryption sequence and a second chaotic sequence corresponding to the second encryption sequence are generated. Herein, $\mu$ is a constant parameter, $z_k$ is the k-th element in z sequence, and $z_{k+1}$ is the (k+1)-th element in z sequence. In the present embodiment, a first preset interval and a second preset interval are set, and the first chaotic sequence is sampled at intervals from a first element of the first chaotic sequence by using the first preset interval. That is, starting from the first element of the first chaotic sequence, the elements separated by the first preset distance are acquired to obtain a row chaotic sequence $\{x_i\}$, i=1, 2, ... M, M denoting the number of pixel rows, namely, the number of pixel rows of the pixel array component. The second chaotic sequence is sampled at intervals from a first element of the second chaotic sequence by using the second preset interval. That is, starting from the first element of the second chaotic sequence, the elements separated by the second preset distance are acquired to obtain a column chaotic sequence $\{y_j\}$, j=1, 2, ... N, N denoting the number of pixels of each pixel row, namely, the number of pixel columns of the pixel array component. The specific sizes of the first preset interval and the second preset interval are not limited in the present embodiment. The number of pixel rows and the number of pixel columns of the pixel array component may be the same or different, and the specific values of the number of pixel rows and the number of pixel columns are also not limited in the present embodiment.

After the row chaotic sequence and the column chaotic sequence are obtained, the row chaotic sequence is used to acquire a row encryption vector, and the column chaotic sequence is used to acquire a column encryption vector, thereby acquiring the row encryption sequence and the column encryption sequence. Specifically, the row chaotic sequence and the column chaotic sequence are rearranged according to a rearrangement order to obtain the row encryption vector and the column encryption vector. The rearrangement order is preset to rearrange the row chaotic sequence and the column chaotic sequence, thereby generating the row encryption vector and the column encryption vector. The specific content of the rearrangement order is not limited in the present embodiment, and it may be arranged from small to large or may be arranged from large to small. In the present embodiment, the row chaotic sequence and the column chaotic sequence are rearranged according to a rearrangement order from small to large to obtain the row encryption vector and the column encryption vector. After the row encryption vector and the column encryption vector are obtained, the position numbers of the elements in the row encryption vector in the row chaotic sequence are sequentially acquired, and the row encryption sequence is constructed by using the position numbers. For example, one image has 7 pixel rows, that is, the pixel array component has 7 pixel rows, namely M=7, and the row chaotic sequence thereof is $\{x_i\}=\{2,8,4,6,5,7,3\}$, and the row encryption vector obtained by rearranging is $\{X_m\}=\{2,3,4,5,6,7,8\}$. The position numbers of the elements in $\{X_m\}$ in $\{x_i\}$ are sequentially acquired and the row encryption sequence is constructed by using the position numbers. That is, a first element in $\{X_m\}$ is $X_{m1}=2$, it is at a first position in $\{x_i\}$, and therefore its position number is 1; a second element in $\{X_m\}$ is $X_{m2}=3$, it is in a seventh position in $\{x_i\}$, and therefore its position number is 7. By analogy, the row encryption sequence $\{\overline{X}_m\}=\{1,7,3,5,4,6,2\}$ is obtained. The same method can be used to obtain the column encryption sequence, and the specific acquisition process is not described here again.

In the present embodiment, the pixel rows in the pixel array component are numbered in an order arranging from top to bottom. Of course, other row numbering methods may also be used, and are not limited in the present embodiment. After acquiring the row encryption sequence, pixel rows corresponding to the respective elements of the row encryption sequence, namely, a pixel row with a row number corresponding to the value of each element in the row encryption sequence, are obtained from the pixel array component of the sensor.

S102: encrypting and sorting pixels in each of the pixel rows by using the column encryption sequence to obtain encrypted pixel rows corresponding to the respective pixel rows.

Before the pixels in each pixel row are encrypted and sorted by using the column encryption sequence, and the pixels in each pixel row are column-numbered. In the present embodiment, the pixels are column-numbered by using a method of numbering sequentially from left to right. Of course, other column numbering methods may also be used, and are not limited in the present embodiment. After the column numbering is performed, the column numbers are arranged in an order of the column encryption vectors to encrypt and sort the pixels in the pixel rows, obtaining encrypted pixel rows corresponding to the respective pixel rows.

S103: arranging the encrypted pixel rows according to a preset arrangement order to obtain an encrypted image.

The encrypted pixel rows are arranged according to a preset arrangement order. The specific content of the preset arrangement order is not limited in the present embodiment. For example, it may be the position order of the elements in the row encryption sequence, and the position order may be used to arrange encrypted pixel rows, obtaining an encrypted image.

With the image encryption method provided by the embodiment of the present disclosure, a chaotic encryption system is used to generate a row encryption sequence and a column encryption sequence, and the pixel positions of pixel rows in the image are transformed by using the row encryption sequence. Then, the pixel rows are encrypted and arranged by using the column encryption sequence. The pixel positions of the image are changed in a spatial range to directly output the encrypted image. That is, the image just generated is an encrypted image. Since the image just outputted is an encrypted image, the method can ensure the security of image information after it is acquired and outputted before it is subjected to the conventional image encryption process. The security vulnerabilities of the existing image encryption technology are remedied, and the problem of security vulnerabilities in the existing image encryption technology that there are not any encryption measures for an image after it is outputted and before it is subjected to the conventional image encryption processing is solved.

An image encryption apparatus provided by an embodiment of the present disclosure will be introduced below. The image encryption apparatus described below and the image encryption method described above may be referred to each other.

Figure 2:
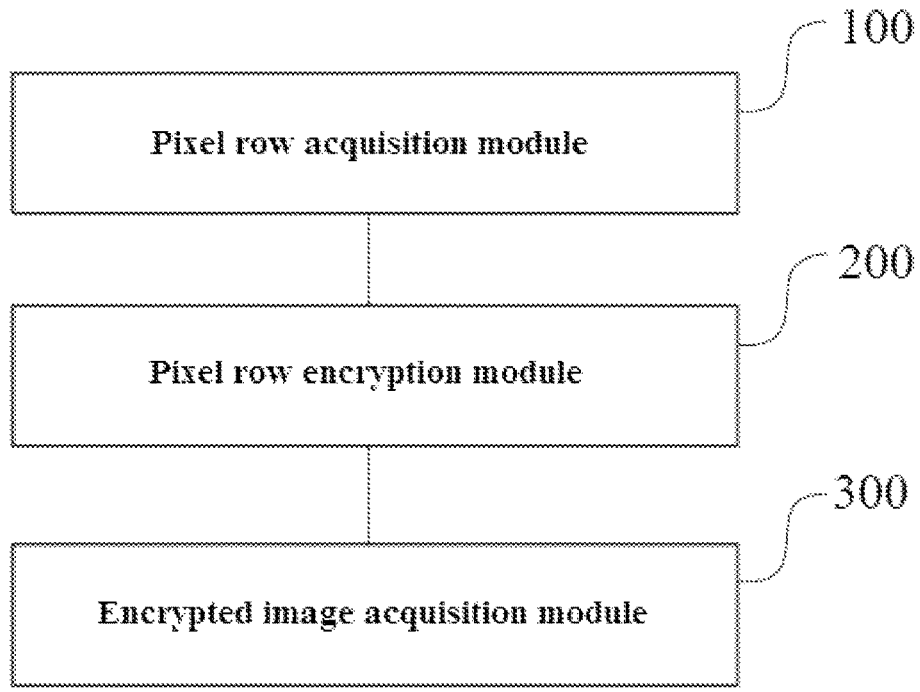
FIG. 2 is a structural schematic view of an image encryption apparatus according to an embodiment of the present disclosure.

Refer to FIG. 2, which is a structural schematic view of an image encryption apparatus according to an embodiment of the present disclosure, including:

a pixel row acquisition module 100 for acquiring a row encryption sequence and a column encryption sequence, and acquiring, from a pixel array component, pixel rows corresponding to the respective elements of the row encryption sequence;

a pixel row encryption module 200 for encrypting and sorting pixels in each of the pixel rows by using the column encryption sequence to obtain encrypted pixel rows corresponding to the respective pixel rows; and an encrypted image acquisition module 300 for arranging the encrypted pixel rows according to a preset arrangement order to obtain an encrypted image.

Optionally, the pixel row acquisition module 100 includes:

an encryption vector acquisition unit for acquiring an encryption sequence, and acquiring a row encryption vector and a column encryption vector by using the encryption sequence; and an encryption sequence acquisition unit for decoding the row encryption vector to obtain the row encryption sequence, and decoding the column encryption vector to obtain the column encryption sequence.

Optionally, the encryption vector acquisition unit includes:

a chaotic sequence acquisition subunit for performing chaotic encryption on the encryption sequence to obtain a row chaotic sequence and a column chaotic sequence; and an encryption vector acquisition subunit for acquiring the row encryption vector by using the row chaotic sequence, and acquiring the column encryption vector by using the column chaotic sequence.

Optionally, the encrypted image acquisition module 300 includes:

an arrangement unit for arranging the encrypted pixel rows according to an order of positions of the elements in the row encryption sequence.

A sensor provided by an embodiment of the present disclosure will be introduced below. The sensor described below and the image encryption method described above may be referred to each other.

Figure 3:
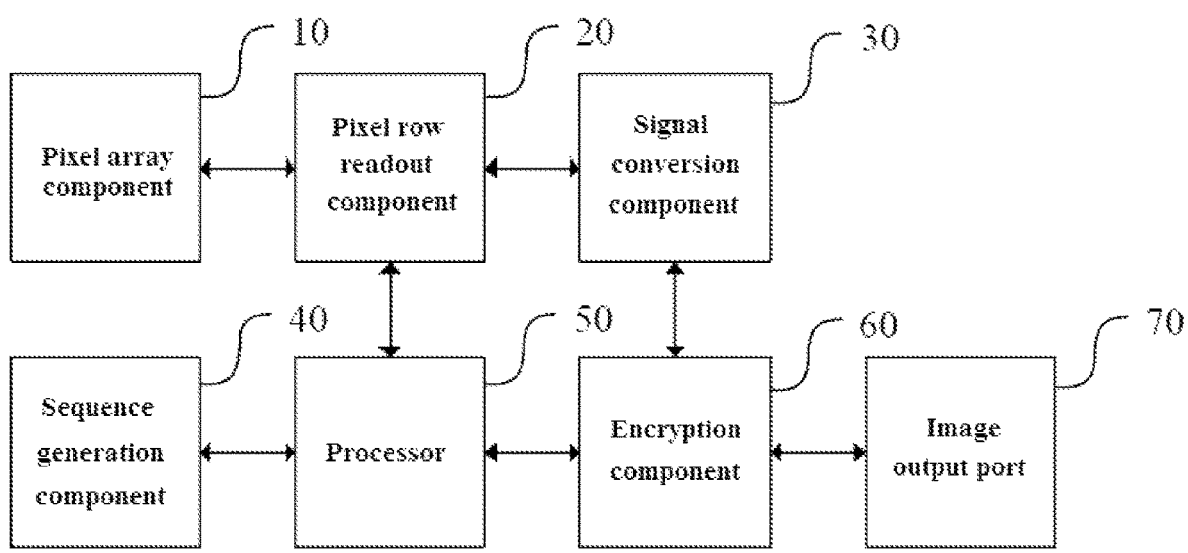
FIG. 3 is a structural schematic view of a sensor according to an embodiment of the present disclosure.

Refer to FIG. 3, which is a structural schematic view of a sensor according to an embodiment of the present disclosure. The sensor includes a pixel array component 10, a pixel row readout component 20, a signal conversion component 30, a sequence generation component 40, and a processor 50, an encryption component 60 and an image output port 70, wherein:

the sequence generation component 40 is connected to the processor 50 for acquiring a row encryption sequence and a column encryption sequence, and sending the row encryption sequence and the column encryption sequence to the processor 50;

the processor 50 is separately connected to the pixel row readout component 20 and the encryption component 60 for receiving the row encryption sequence and the column encryption sequence, and sending the row encryption sequence to the pixel row readout component 20 and the encrypting component 60 and sending the column encryption sequence to the encryption component 60;

the pixel row readout component 20 is separately connected to the signal conversion component 30 and the pixel array component 10 for acquiring an analog signal pixel row in the pixel array component 10 according to the row encryption sequence, and sending the analog signal pixel row to the signal conversion component 30;

the signal conversion component 30 is connected to the encryption component 60 for performing a digitization processing of the analog signal pixel row to obtain a pixel row, and sending the pixel row to the encryption component 60; and the encryption component 60 is connected to the image output port 70 for encrypting the pixel rows by using the row encryption sequence and the column encryption sequence to obtain an encrypted image, and outputting the encrypted image via the image output port 70.

A computer readable storage medium provided by an embodiment of the present disclosure will be introduced below. The computer readable storage medium described below and the image encryption method described above may be referred to each other.

The present disclosure further provides a computer readable storage medium having stored thereon a computer program that, when being executed by a processor, implements the steps of the image encryption method described above.

The computer readable storage medium may include: a U disk, a mobile hard disk, a read-only memory (ROM), a random access memory (RAM), a magnetic disk, or an optical disk, and various media, which can store program codes.

Various embodiments in the description are described in a progressive manner, and each embodiment focuses on the differences from other embodiments, and the same or similar parts between various embodiments may be referred to each other. For the apparatus disclosed in the embodiment, since it corresponds to the method disclosed in the embodiment, the description is relatively simple, and for a relevant part, the description of the method part can be referred to.

A person skilled in the art may further appreciate that units and algorithm steps of various examples described in conjunction with the embodiments disclosed herein can be implemented by electronic hardware, computer software or a combination of both. In order to clearly illustrate the interchangeability of hardware and software, the constitutions and steps of the various examples have been generally described in terms of functions in the above description. Whether these functions are performed by means of hardware or software depends on a specific application and design constraints of the technical solution. The person skilled in the art may use different methods to implement the described functions for each specific application, but such implementation should not be considered to be beyond the scope of the present disclosure.

The steps of the method or algorithm described in conjunction with the embodiments disclosed herein may be implemented directly by hardware, software modules executed by a processor, or a combination of both. The software modules may be placed in a random access memory (RAM), memory, a read only memory (ROM), an electrically programmable ROM, an electrically erasable programmable ROM, a register, a hard disk, a removable disk, a CD-ROM, or a storage medium in any other form well known in the art.

Finally, it should also be noted that the relationships such as first and second herein are used merely to distinguish one entity or operation from another entity or operation, and do not necessarily require or imply that there are any such actual relationships or orders between these entities or operations. Furthermore, the terms "comprise," "comprising," "include" or "including" or any other variants are intended to include a non-exclusive inclusion, so that a process, a method, an article, or a sensor including a series of elements not only includes those elements but also includes other elements not explicitly listed, or further includes elements that are inherent to the process, the method, the article, or the sensor.

The image encryption method and apparatus, the sensor and the computer readable storage medium provided by the present disclosure are introduced in detail above. The principles and embodiments of the present disclosure are described herein by using the specific examples. The description of the above embodiments is only used to help understand the method and the core idea of the present disclosure. At the same time, for the ordinary persons skilled in the art, according to the idea of the present disclosure, there will be changes in the specific embodiments and application scopes. In summary, the content of the present description should not be construed as limiting the present disclosure.

What is claimed is:

1. An image encryption method, comprising:
acquiring a row encryption sequence and a column encryption sequence, and acquiring, from a pixel array component of a sensor, pixel rows corresponding to the respective elements of the row encryption sequence;
encrypting and sorting pixels in each of the pixel rows by using the column encryption sequence to obtain encrypted pixel rows corresponding to the respective pixel rows; and
arranging the encrypted pixel rows according to a preset arrangement order to obtain an encrypted image.

2. The image encryption method according to claim 1, wherein the acquiring the row encryption sequence and the column encryption sequence comprises:
acquiring an encryption sequence, and acquiring a row encryption vector and a column encryption vector by using the encryption sequence; and
decoding the row encryption vector to obtain the row encryption sequence, and decoding the column encryption vector to obtain the column encryption sequence.

3. The image encryption method according to claim 2, wherein the acquiring the row encryption vector and the column encryption vector by using the encryption sequence comprises:
performing chaotic encryption on the encryption sequence to obtain a row chaotic sequence and a column chaotic sequence; and
acquiring the row encryption vector by using the row chaotic sequence, and acquiring the column encryption vector by using the column chaotic sequence.

4. The image encryption method according to claim 1, wherein the arranging the encrypted pixel rows according to the preset arrangement order comprises:
arranging the encrypted pixel rows according to an order of positions of the elements in the row encryption sequence.

5. An image encryption apparatus, comprising:
a pixel row acquisition module for acquiring a row encryption sequence and a column encryption sequence, and acquiring, from a pixel array component of a sensor, pixel rows corresponding to the respective elements of the row encryption sequence;
a pixel row encryption module for encrypting and sorting pixels in each of the pixel rows by using the column encryption sequence to obtain encrypted pixel rows corresponding to the respective pixel rows; and
an encrypted image acquisition module for arranging the encrypted pixel rows according to a preset arrangement order to obtain an encrypted image.

6. The image encryption apparatus according to claim 5, wherein the pixel row acquisition module comprises:
an encryption vector acquisition unit for acquiring an encryption sequence, and acquiring a row encryption vector and a column encryption vector by using the encryption sequence; and
an encryption sequence acquisition unit for decoding the row encryption vector to obtain the row encryption sequence, and decoding the column encryption vector to obtain the column encryption sequence.

7. The image encryption apparatus according to claim 6, wherein the encryption vector acquisition unit comprises:
a chaotic sequence acquisition subunit for performing chaotic encryption on the encryption sequence to obtain a row chaotic sequence and a column chaotic sequence; and
an encryption vector acquisition subunit for acquiring the row encryption vector by using the row chaotic sequence, and acquiring the column encryption vector by using the column chaotic sequence.

8. The image encryption apparatus according to claim 5, wherein the encrypted image acquisition module comprises:
an arrangement unit for arranging the encrypted pixel rows according to an order of positions of the elements in the row encryption sequence.

9. A sensor comprising a processor, a sequence generation component, a pixel array component, a pixel row readout component, a signal conversion component, an encryption component, and an image output port, wherein:
the sequence generation component is connected to the processor for acquiring a row encryption sequence and a column encryption sequence, and sending the row encryption sequence and the column encryption sequence to the processor;
the processor is separately connected to the pixel row readout component and the encryption component for receiving the row encryption sequence and the column encryption sequence, and sending the row encryption sequence to the pixel row readout component and the encrypting component, and sending the column encryption sequence to the encryption component;
the pixel row readout component is separately connected to the signal conversion component and the pixel array component for acquiring an analog signal pixel row in the pixel array component according to the row encryption sequence, and sending the analog signal pixel row to the signal conversion component;
the signal conversion component is connected to the encryption component for performing a digitization processing of the analog signal pixel row to obtain a pixel row, and sending the pixel row to the encryption component; and
the encryption component is connected to the image output port for encrypting the pixel rows by using the row encryption sequence and the column encryption sequence to obtain an encrypted image, and outputting the encrypted image via the image output port.

10. A computer readable storage medium for storing a computer program, wherein the computer program, when being executed by a processor, implements the image encryption method according to claim 1.

11. A computer readable storage medium for storing a computer program, wherein the computer program, when being executed by a processor, implements the image encryption method according to claim 2.

12. A computer readable storage medium for storing a computer program, wherein the computer program, when being executed by a processor, implements the image encryption method according to claim 3.

13. A computer readable storage medium for storing a computer program, wherein the computer program, when being executed by a processor, implements the image encryption method according to claim 4.

\* \* \* \* \*